Oct. 28, 1930.  W. F. BELL  1,779,690
UNDERCARRIAGE CONSTRUCTION FOR AIRCRAFT
Filed Aug. 13, 1928
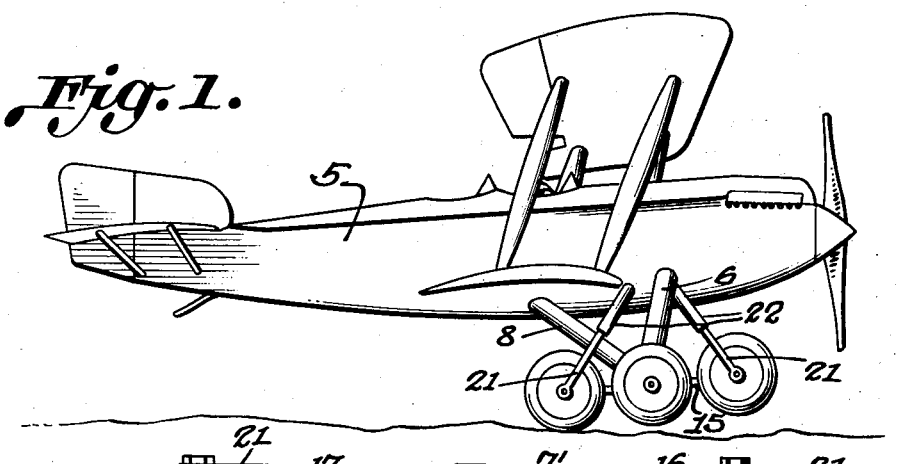
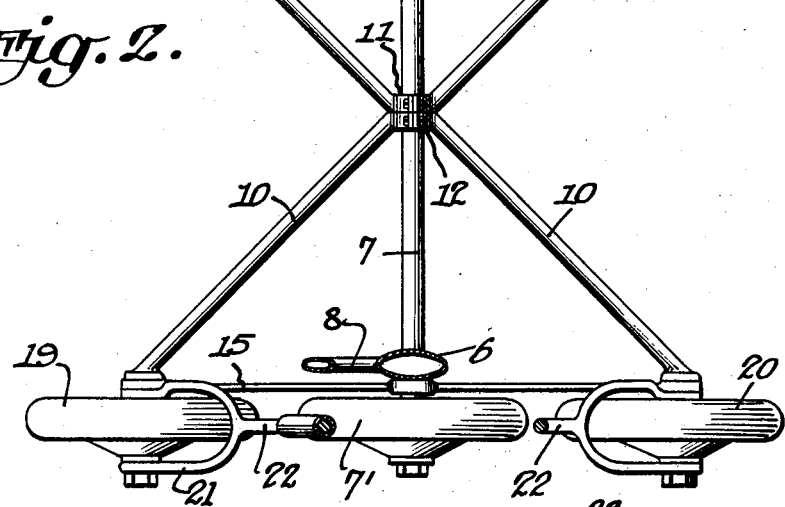
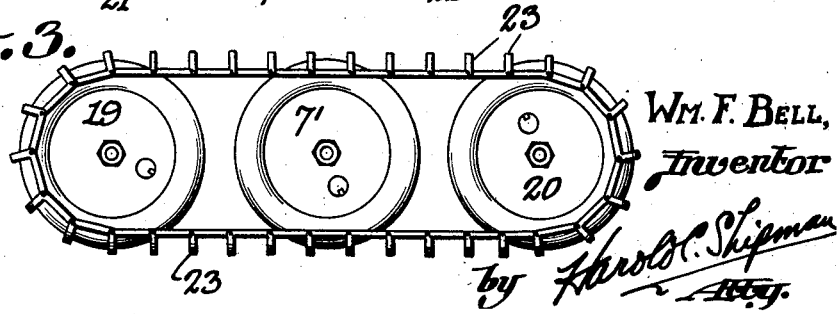
WM. F. BELL,
Inventor Patented Oct. 28, 1930

1,779,690

UNITED STATES PATENT OFFICE

WILLIAM FREDERICK BELL, OF BRITANNIA BAY, ONTARIO, CANADA

UNDERCARRIAGE CONSTRUCTION FOR AIRCRAFT

Application filed August 13, 1928. Serial No. 299,353.

This invention relates to undercarriage construction for aircraft.

The object of my invention is to provide a means to facilitate landing wherein a plurality of wheels are so mounted as to provide a contact with a considerable area of the ground when running over the ground in landing or in starting.

A further object is to provide means for mounting a plurality of auxiliary wheels to act as additional cushioning means to the primary wheels, such as are now commonly used in undercarriage constructions for aircraft.

A further object is to provide a plurality of wheels to be used in combination with the wheels now commonly used on aircraft, so as to provide a greater length of contact with the ground in fixed horizontal alignment therewith on each side so that if the aircraft lands or starts off over ground in which there is a ditch or ridges, the wheels will bridge themselves across the same.

A further object is to provide undercarriage construction embodying a plurality of wheels for each side of the aircraft, which wheels will have mounted thereon an endless chain which will provide traction means when the landing field is soft or when the aircraft travels over ditches or other irregularities.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a perspective view of a general type of aircraft, showing my undercarriage construction in combination therewith.

Fig. 2 is a top plan view of the undercarriage construction, parts being broken away and one of the wheels being shown in dotted lines to more clearly show the construction embodied.

Fig. 3 is a side plan view of the wheels, showing the traction chain mounted thereon.

Like numerals of reference designate corresponding parts throughout the different views.

5 indicates the body portion of the aircraft which may be of any particular type, style or design. On most of the aircraft downwardly extended legs 6 provide the supports for a transverse axle 7. This axle is supported with rearwardly inclined braces 8. I do not wish to be limited in any way to the design of the legs 6 or the braces 8, as these may be of any design as now commonly used on aircraft construction and may be modified to a great extent to adapt themselves to the particular design, style or type of aircraft with which they are to be used. Suitable mounted in the outer ends of the axle 7, I provide wheels 7'.

9 and 10 indicate V-shaped brackets, the central portions 11 and 12 forming a central bearing on the axle 7. 14 and 15 are side stringers supported centrally on the axle 7 and having suitable engagements at their ends to the outwardly directed ends of their respective V-brackets 9 and 10. If desired each part of the V-brackets 9 and 10 may be provided with an outwardly directed stub axle 16 formed integral therewith or this axle may be made separate and have suitable fixed connections with the end of the stringer 14—15 and the V-bracket 9—10. 17, 18, 19 and 20 are auxiliary wheels mounted on the stub axles 16. Each wheel is provided with a fork 21, the ends of which are carried on the stub axle 16. The shank portion 22 of each one of these forks 21 may be suitably connected to the body portion 5 in independent relationship thereto. In the drawing, Fig. 1, I have shown this shank 22 as one of the parts of a telescopic extension, the upper part of which is supported from the body portion 5 and which is provided interiorly with suitable cushioning means such as is commonly used for a purpose of this nature.

It will be noted that I provide the stringers 14—15 which retain in rigid alignment the respective sets of wheels, each set of wheels being pivotally supported from the same axle.

If desired a traction chain 23 may be extended around the wheels 19—7'—20 and

21—7'—18. This will be found of advantage in soft ground and in going over irregular ground, such as ditches and other transverse ruts in which a single wheel would imbed itself. This traction chain may be provided in many different forms. In Fig. 4, I have shown a detail perspective view of one of the preferred forms which may be used. This comprises U-shaped links 24 provided with side arms 25 extending back from one side in parallel relationship. Each arm is provided with a suitable opening therethrough. The opposite ends of the links 24 are provided with openings 26. When the links are formed together to provide the traction chain 23, rivets are extended through the openings 26, through the openings in the arms 25 and are riveted so as to provide a pivotal connection for the links. The traction chain 23 will also be found of advantage in traversing snow in the winter months.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

1. An undercarriage for aircraft comprising a primary set of wheels mounted on an axle suitably supported from the body portion of said aircraft; an auxiliary wheel in front of and behind each of said wheels; a stringer pivotally mounted on said axle and rigidly supporting said auxiliary wheels in fixed alignment with their respective primary wheels and means for independently cushioning each auxiliary wheel relative to the body portion of said aircraft.

2. An undercarriage for aircraft comprising a primary set of wheels mounted on an axle suitably supported from the body portion of said aircraft; an auxiliary wheel in front of and behind each of said wheels; a stringer pivotally mounted on said axle and rigidly supporting said auxiliary wheels in fixed alignment with their respective primary wheels; means for independently cushioning each auxiliary wheel relative to the body portion of said aircraft and the pivotal action of one set of auxiliary wheels being independent of the other set of auxiliary wheels.

3. An undercarriage for aircraft comprising a primary set of wheels mounted on an axle suitably supported from the body portion of said aircraft; an auxiliary wheel in front of and behind each of said wheels; a stringer pivotally mounted on said axle and rigidly supporting said auxiliary wheels in fixed alignment with their respective primary wheels and means for bracing each set of auxiliary wheels, the outer ends of said means providing a stub axle for mounting its respective auxiliary wheel.

In testimony whereof, I affix my signature.

WILLIAM FREDERICK BELL.